United States Patent [19]

Goldfield et al.

[11] Patent Number: 5,215,657

[45] Date of Patent: Jun. 1, 1993

[54] WATER TREATMENT SYSTEM

[76] Inventors: H. P. Goldfield, 2230 California St., NW., Washington, D.C. 20008; Marvin Weintraub, 5743 Kingsfield W., Bloomfield, Mich. 48322

[21] Appl. No.: 729,711

[22] Filed: Jul. 3, 1991

[51] Int. Cl.$^5$ ............................................. B01D 63/00
[52] U.S. Cl. ..................... 210/321.64; 210/89; 210/90; 210/283; 210/284; 210/290; 210/321.75; 210/321.84; 220/300
[58] Field of Search ............... 210/321.64, 321.75, 210/321.84, 295, 85, 90, 446, 455, 259, 198.1, 284, 192, 287, 292, 258, 232, 283, 282, 290; 220/601, 200, 204, 376, 293, 297, 300

[56] References Cited

U.S. PATENT DOCUMENTS

| 952,979 | 3/1910 | Allen | 210/283 |
|---|---|---|---|
| 3,585,130 | 6/1971 | Gregory | 210/266 |
| 4,389,311 | 6/1983 | LaFreniere | 210/198.1 |
| 4,615,799 | 10/1986 | Mortensen | 210/177 |
| 4,636,473 | 1/1987 | Kleinstreuer | 210/321.84 |
| 4,732,294 | 3/1988 | Bohler et al. | 220/300 |
| 4,764,274 | 8/1988 | Miller | 210/266 |
| 4,769,143 | 9/1988 | Deutsch et al. | 210/284 |
| 4,826,594 | 5/1989 | Sedman | 210/283 |
| 5,024,477 | 6/1991 | Yen | 210/259 |
| 5,110,479 | 5/1992 | Frommer et al. | 210/290 |

Primary Examiner—Robert A. Dawson
Assistant Examiner—Ana Fortuna
Attorney, Agent, or Firm—Weintraub, DuRoss & Brady

[57] ABSTRACT

Water treatment apparatus includes a housing, and at least one canister disposed within the housing. Inside the canister are disposed a first water treatment material and a second water treatment material, the first material being different from the second material. Both the first material and the second material acting alone makes the contaminated water more suitable for human consumption. Preferably, the first material is disposed in a first stage, the second material is disposed in a second stage which is physically discrete from the first stage. Alternatively, the first material and the second material may be admixed together in the canister. The apparatus preferably includes an alarm for indicating when the material for treating the contaminated water needs to be replaced.

11 Claims, 3 Drawing Sheets

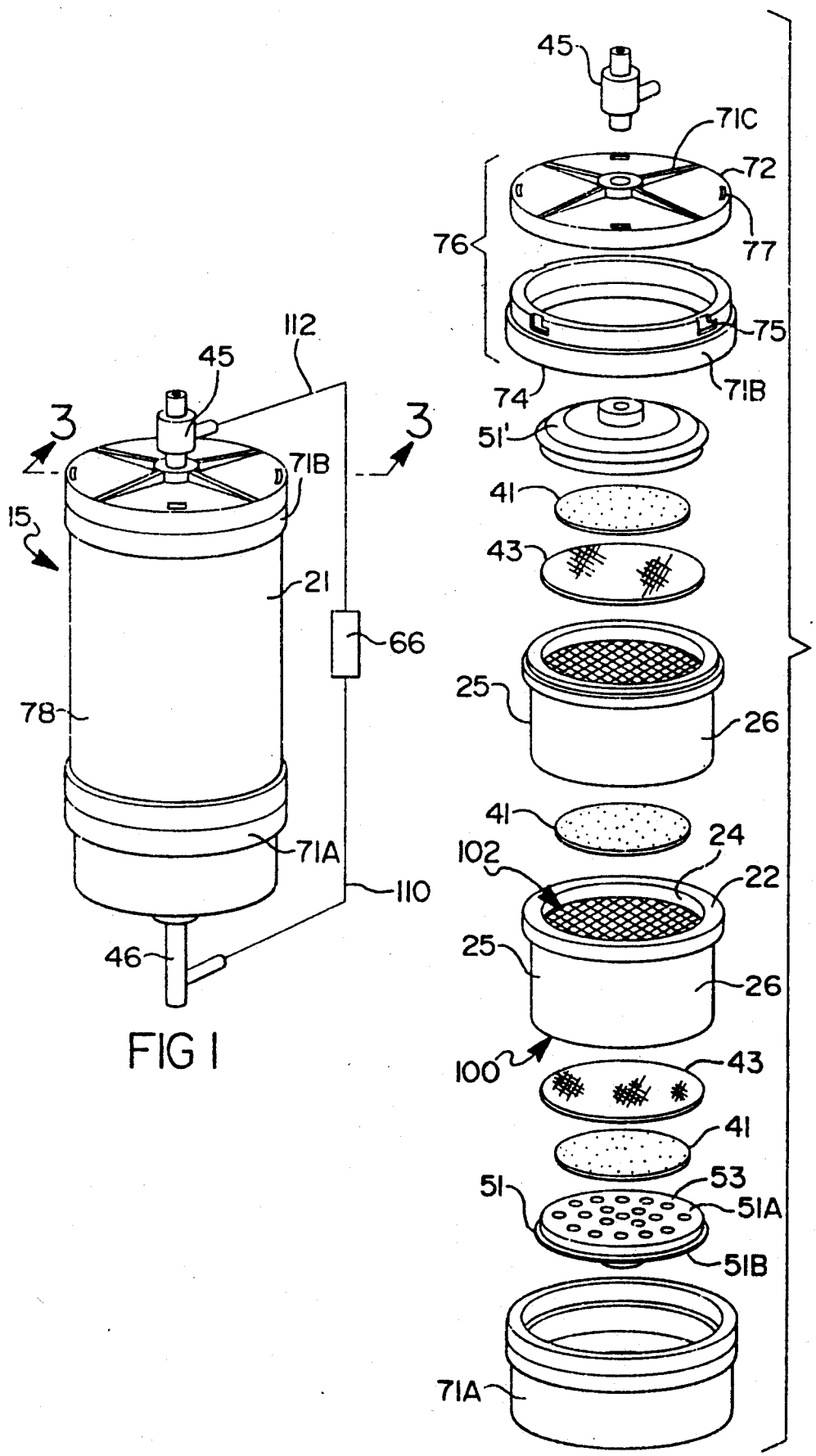

WATER TREATMENT SYSTEM

BACKGROUND OF THE INVENTION

1. Field of the Invention

The present invention relates to a water treatment apparatus. More particularly, the present invention relates to a multi-stage water treatment apparatus. Even more particularly, the present invention relates to water treatment apparatus for portable water.

2. Background Art

Much of the public concern about the quality of drinking water centers on how the water looks, tastes, or smells. Unfortunately, water that looks, tastes, and smells just fine poses some of the most severe health hazards. More than 100 contaminants are now subject to water-safety regulations. For example, at least 42,000,000 Americans are exposed to dangerous amounts of lead in their drinking water.

Therefore, it is generally recommended that concerned consumers learn as much as possible about the water quality in their homes. Once specific contaminants have been identified, then, consumers are encouraged to seek out water treatment systems that trap the identified contaminants from the water supply, before the potable water is consumed.

Hence, as the public learns more about water quality, it becomes increasingly important to provide water treatment that is tailored to both the universal as well as the unique needs of the consumer.

As is subsequently detailed, the present invention is directed to a filtering apparatus which is intended to achieve such purpose.

SUMMARY OF THE INVENTION

The water treatment apparatus hereof includes a housing and a filtering canister or stage disposed within the housing. Disposed within the canister are at least two different filtering materials or media. Both the materials acting alone are capable of making the water more suitable for human consumption. Preferably, the first material is disposed in a first stage, and the second material is disposed in a second stage, the two stages being discrete from, and in fluid communication with, each other. Alternatively, the two materials may be admixed together in a single canister. The apparatus preferably includes an alarm for indicating when the material for treating the contaminated water needs to be replaced.

For a more complete understanding of the water treatment apparatus of the present invention, reference is made to the following detailed description and accompanying drawings in which the presently preferred embodiments of the invention are illustrated by way of example. As the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 is a perspective view of a water treatment apparatus in accordance with the present invention;

FIG. 2 is an exploded view of a canister assembly used in the practice of the present invention;

DESCRIPTION OF THE PREFERRED EMBODIMENTS

Figure 2A:
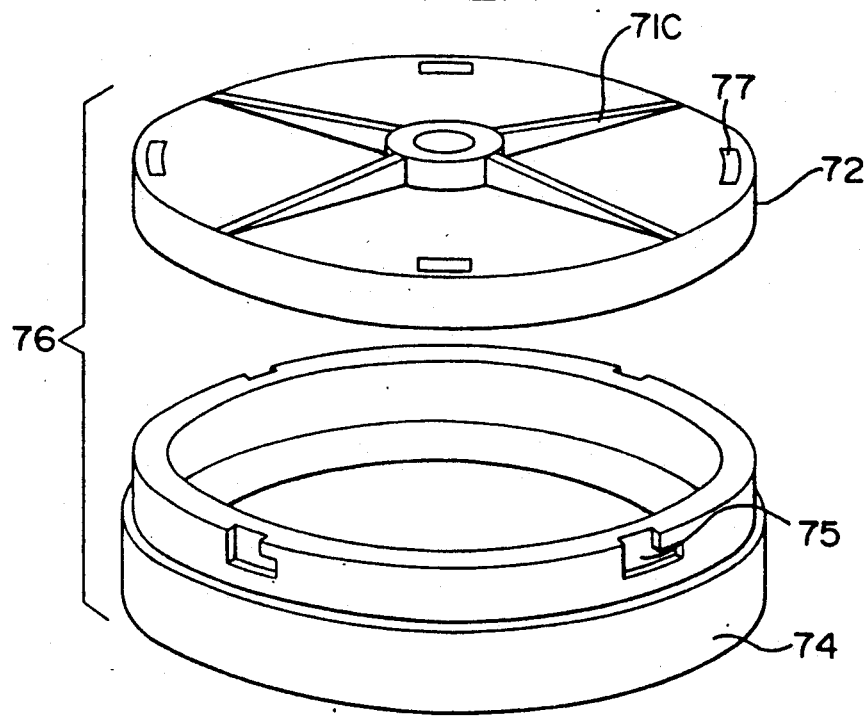
FIG. 2A is an exploded assembly view of a cap and sleeve member used to close off the water treatment apparatus hereof.

Referring now to the drawing, there is depicted therein a first embodiment of the water treatment or filtering apparatus hereof, which is particularly useful as a residential or office-type or a counter-top unit, an under counter unit, or an ice-maker unit or the like is subsequently detailed.

As shown in the drawing, the apparatus 15 hereof, generally, includes a housing 21, having two end covers; an inlet cover 71A and an outlet cover 71B. Each cover 71A or 71B, preferably, comprises a two-piece assembly; a cap member 72 and a sleeve member 74. Each cover 71A or 71B is structurally reinforced with a plurality of ribs 71C, the structural reinforcement serves to exert a compression or pressure on each of the canisters or stages disposed within the housing, as is hereinafter explained.

Each sleeve member 74 is positioned inside the cap member 72, to insure a secure fit therewith. The portion of the cap member 72 that is affixable to the housing 21 is preferably internally threaded for secure engagement with the externally threaded housing 21. The portion of the sleeve member 74 that is affixed to the cap member 72 is recessed, so that the recessed portion fits inside the cap member 72. The cap member 72 has a plurality of rectangular-shaped protrusions 73 extending inwardly from the internal surface thereof, the protrusions 73 being evenly spaced thereabout. The cap member 72 also has a plurality of passages 77 protruding through the lid portion thereof (see FIG. 2C), each passage 77 being generally aligned with a protrusion 73. The sleeve member 74 has a plurality of apertures 75 disposed therein, the apertures 75 being generally L-shaped. The number of apertures 75 corresponding to the number of protrusions 73, and the apertures 75 being alignable therewith for secure engagement between the cap member 72 and the sleeve member 74.

To assemble the apparatus 15, the sleeve member 74 is positioned inside the cap member 72, and the protrusions 73 of the sleeve member 74 are aligned with the apertures 75 of the cap member 72. The protrusion 73 fit into the vertical portion of the L-shaped apertures 75. The protrusions 73 and the L-shaped apertures 75 are both evenly spaced in a similar manner. Each protrusion 73 is inserted into the vertical portion of each aligned L-shaped aperture 75 (the unlocked position). The cap member 72 is then rotated relative to the sleeve member 74 in a counter-clockwise direction, so that the protrusions 73 are engaged with the portion of the L-shaped apertures 75 away from the vertical portion to lock the cap member 72 to the sleeve member 74.

In this locked position, an aperture 75 is in fluid communication with one of the passages 77. The protrusion 73 of the cap member 72 combine with the apertures 75 of the sleeve member 74 to form a retention means 76.

The apertures 75 disposed in the upper cover 71B are in fluid communication with the passages 77, enabling water to drain therethrough when the cover 71 is disposed in the locked position. This water drainage capability enables purging of the apparatus 15 if any water becomes channeled between the interior of the housing and any stage or stages. The apertures 75 and passages 77 formed on the cover 71A positioned on the lower end of the housing are permanently sealed to prevent water leakage therefrom.

Since the housing 21 is preferably cylindrical and generally symmetrical about a plane normal thereto, the apparatus 15 may be positioned in such a manner that water is treated flowing upward therethrough or downward therethrough. Generally in a portable unit, it is more convenient to pour water into and through the apparatus 15, so that the water is processed downwardly. If the apparatus 15 is disposed in a water line, the water generally enters the apparatus 15 from the bottom and is discharged from the top thereof. Accordingly, it is important in a multiple-stage configuration to arrange the multiple stages sequentially within the apparatus 15 in the direction of water is flow.

Figure 2B:
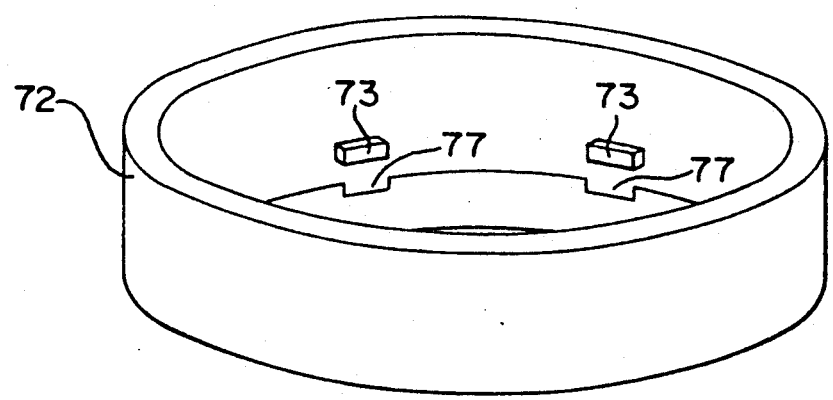
FIG. 2B is a perspective view of the sleeve member of FIG. 2A.

As shown in FIG. 2, the apparatus 15 of the present invention, preferably includes at least two stages or canisters 23 and 25, each being of similar shape and configuration, and each being generally nestable within the other. The stages are preferably cylindrical. A water discharge portion of each stage 23 has a raised lip 22, and recessed center portion 24, the raised lip 22 extending about the perimeter of each stage 23, or 25.

Each stage 23 or 25 comprises a cylindrical body 26 having an inlet side 100. In this regard, each inlet can become an outlet and, vice versa, depending on the flow path of the water through the apparatus. The inlet 100 and the outlet 102 are each provided with a multiplicity of apertures 104 to permit water to flow freely therethrough, while retaining a water treatment media 31 therewithin.

In use, a membrane 41 is disposed inside the canister 23 and nests against the outlet 102 thereof. Preferably, one or more of the membranes 41 are disposed within the outlet of one or more of the canisters.

Preferably, a membrane 41 is disposed downstream of a stage, and is useful in trapping contaminants that may be added to the water as a result of treatment from a preceding stage.

The membrane 41 is, preferably, a 10-micron polyester fiber which traps silverized charcoal or resins, the silverized charcoal being used as an active material in one of the stages to immobilize micro-organisms present in the water.

Also, a thin orlon filter 43 may be positioned in the housing 21 between the stages 23 and 25 to trap heavy metals or cellulose acetate, silver being a heavy metal that may be used to immobilize micro-organisms that may be present in the water, as hereinafter set forth.

The membranes 41 trap contaminants from the water to make the water more suitably for human consumption. The membranes 41 and 43 are removably disposed upstream of the first stage 23, downstream of the second stage 25, or between stages 23 and 25, to ensure that any particles entrained within the water do not pass through the apparatus 15.

The apparatus 15 includes an insert member 51, disposed at each end thereof. The insert member 51 is substantially hollow and includes a first member 51A snugly retained within a second member 51B. The first member 51A is disposed proximate to the cover 71 and includes a centrally disposed opening passing therethrough. The second member 51B includes a multiplicity of holes 53 evenly distributed therethrough, for controlling the flow of water entering the apparatus 15. To increase the dwell time within the apparatus 15, the insert member 51 disposed at the outlet end 63 may have a plurality of holes 53 concentrated near the center thereof (not shown). Also, and although not shown, a multiplicity of holes 53 concentrated about the perimeter of the insert member 51 may be used in lieu of the configuration shown.

The inlet insert member 51 is in fluid communication with a water inlet 46 so that water flows through the holes 53. The insert member 51 is, also, in fluid registry with the inlet of the associated stage 23 such that water flows from the holes through and into the inlet of the stage 23.

A membrane pressure switch 66 which defines an alarm is, preferably, used in the water treatment apparatus 15 of the present invention. The pressure switch 66 has one side in fluid communication with the fluid inlet of the apparatus 15 and a second side is in fluid communication with the fluid outlet of the apparatus 15. The pressure switch 66 is electrically powered and includes a conductive thin walled elastic membrane. The membrane and a pair of spaced apart electrical contacts deflect when the water pressure on the first side of the membrane is not balanced by the pressure on the opposite side of the membrane. The membrane of pressure switch 66 is selected so that only a pressure drop that exceeds the normal range of a pressure drop that is to be normally expected through the water treatment apparatus 15 will trigger an alarm condition.

The pressure switch 66 is normally open, and when the pressure switch 66 senses a pressure differential across the apparatus 15, the membrane is brought into contact with the electrical contacts to form a bridge therebetween and thus close the switch. This causes an electrical signal to be sent to either an audio or visual alarm signal. Also, to identify which of the stages has been spent, a plurality of membrane switches 66 (not shown) may be electrically engaged with a plurality of lights, one light for each stage 23, to indicate which water treatment media is causing the pressure drop. Of course, alternative flow or pressure switches may be used which indicate either a reduction in flow or a pressure drop across the apparatus 15.

In use, a first tap line 110 is inserted into the water inlet 46 side of the housing and a second tap line 112 is inserted into the water outlet 45 (see FIG. 1). Water thus flows to both sides of the membrane within the switch 66. When there is a pressure differential across the membrane, the membrane will then move into contact with the electrical contacts within the switch to close causing an alarm signal.

As depicted in FIG. 2, the contaminated water entering the water treatment apparatus 15 of the present invention is initially circulated through the insert 51, then, through the membrane or filter 41, and an orlon filter 43, before entering into the first stage 23. The water continues through the treating material 31 in the first stage 23, and then passes through another polyester filter or membrane 41, the treating material 33 in the second stage 25, a second orlon filter 43, and a second polyester filter 41, before the treated water is discharged from the water treatment apparatus 15 through the insert member 51; and the outlet 45.

Figure 3:
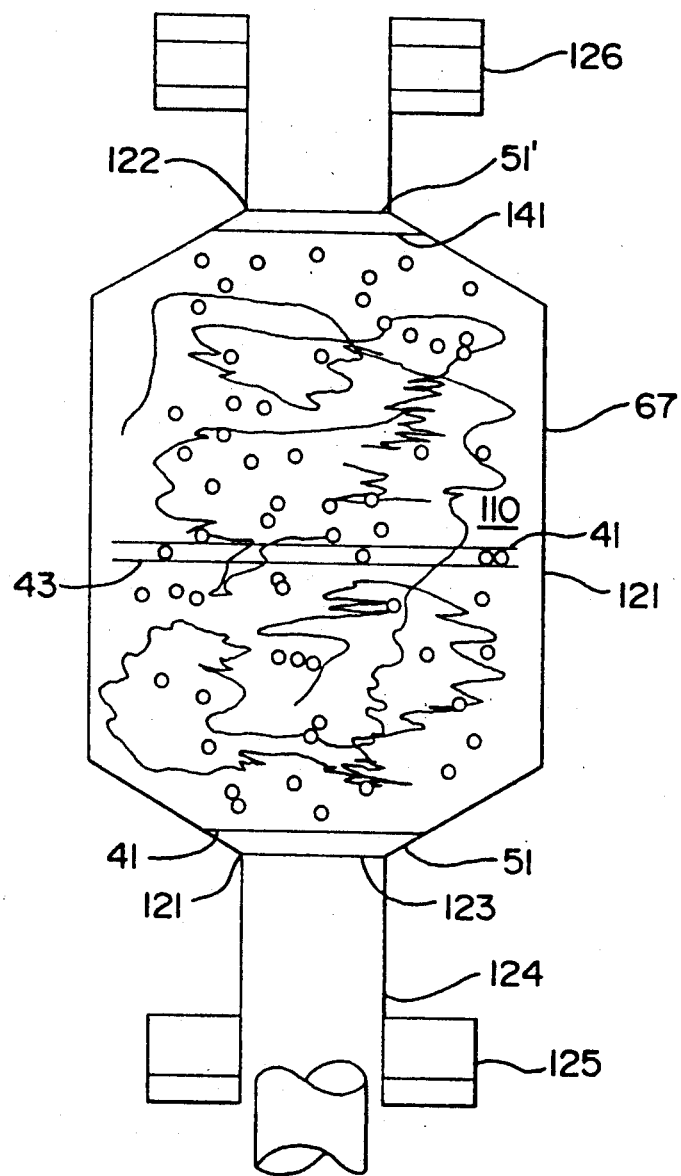
FIG. 3 is a partial, cross-sectional view of a second embodiment of the water treatment apparatus of the present invention.

FIG. 3 depicts a further embodiment of the present invention. In accordance herewith, the chamber 110 of the housing 121 defines a single canister 67 exteriorly thereof. The single canister 67 may be interiorly segregated into stages by separating discrete sections of treatment materials with membranes 41 and 43. The elongated cylinder is closed at each end by insert members 51 and 51' similar to those previously described.

Likewise, the single chamber 110 may be used for a mixed bed configuration where the water treatment media are mixed together. Alternatively, the housing 67 may be also used where the treating materials are individually packed in discrete containers, such as bags, and the discrete containers are arranged within the single-stage housing 67 so that the water to be treated must pass therethrough.

According to this embodiment, the apparatus 15 comprises the housing 121, which is formed from any suitable material such as polystyrene, polycarbonates, or other suitable resinous material. The housing 121 has an inlet 122 and an outlet 122. The inlet 121 includes at least one opening 123 in which is fitted a water inlet line 124. A conventional snap-on connector 125 is connected to the line 124. The snap-on connector, which is otherwise denoted as a "quick disconnect" is a well known and commercially available device or connector which rapidly attaches and detaches through a snap fit onto faucet, a spigot and the like.

Disposed within the housing at the inlet side is a membrane 141 similar to the membrane 41 discussed hereinabove. The outlet or outlet side 122 of the housing 121 is a mirror image of the inlet side and includes a "quick disconnect" 126. A membrane 141' is disposed at the outlet side 122.

The filtering media disposed within the chamber 10 is, preferably, a mixture of resins, charcoal and silverized charcoal.

In this embodiment, the single stage 67 in chamber 21 is preferably filled upside down. Initially, a first porous membrane 41 or a combination of filters 41 and 43 is inserted into the housing adjacent to he insert member 51. The single stage 67 is then filled with a first water treating material. A second porous membrane 41 is placed over the material. The stage 67, is, then, filled with one or more resins. An additional membrane 41, or a combination of membranes 41 and 43 is then positioned thereover and the cover is then fitted over the enclosure. The cover may then be glued or ultrasonically welded to the housing 121. The tubing used for the connections is preferably polyethylene. The materials of construction for the housing 121 are, preferably, water approved materials.

It should be noted that the apparatus 15 may have the housings 21 or 121 as well as the covers 51, 51' etc all fabricated from a flexible material such as rubber, neoprene, etc. so that the filtering apparatus may be bent around obstructions such as are found in drinking fountains, or the like.

Each installation will vary somewhat depending upon the location and the direction of the water lines, and the space available proximate to a water outlet. Preferably, the apparatus 15 is installed proximate to a water outlet (either under the counter or a counter top unit). If the space under the water outlet is limited, mounting the apparatus on a wall directly under a kitchen sink may be a desirable option, and additionally plastic tubing will be required to make the necessary connections.

In practicing the present invention, it should be noted that under normal flow conditions, the maximum flow rate through the water treatment apparatus of the present invention is about one-half of a gallon per minute. There is essentially no pressure drop through the water treatment apparatus. Accordingly, even without an alarm, a pressure drop within the apparatus will indicate that one of the treating materials is spent. The pressure drop also results in a reduction in flow through the water treatment apparatus 15 (e.g.—from a flow rate of one-half of a gal/min to a reduced flow rate of one third of a gal/min).

Generally, the longer the dwell time of the water to be treated within the apparatus, the more likely that the targeted contaminant will be trapped by the treating material disposed therewithin. The flow rate through the water treatment apparatus or can be further adjusted by:

(a) increasing the diameter of the apparatus;
(b) increasing the length of the apparatus; or
(c) inserting orifices (not shown) into the water inlet line.

The flow rate and the flow profile of water through the treatment apparatus of the present invention may also be regulated by the number of holes that are drilled in the insert members.

In the preferred embodiment of the water treatment apparatus 15 of the present invention, the first stage through which the water to be treated passes through the first material which immobilizes micro-organisms which are present in the water, and the second stage through which the water passes contains a second material which filters the immobilized micro-organisms from the first stage.

"Immobilizing" the micro-organisms which means either killing or rendering dormant or inoperable for at least the time necessary to flow the water through the apparatus. The preferred means for immobilizing the micro-organisms is silver deposited on a carrier material or a substrate, such as silver-impregnated charcoal. The charcoal kills active micro-organisms present in the water. The micro-organisms are killed when they are absorbed onto the surface of the silver-impregnated charcoal. Silver deposited onto clay, alumina, or silica also produces satisfactory results. Other means for immobilizing the micro-organisms includes ultraviolet heat applied within the container to the water to be treated, and direct chemical treatment of the water.

For water containing large volumes of micro-organisms, it is generally recommended that higher concentrations of silver be used. However, substrates with higher silver concentrations are more expensive, and the higher concentrations of silver can cause more silver to be dissolved in the water which is a contaminant that must be subsequently removed therefrom. It may become necessary to increase the dwell time within the apparatus to remove higher concentrations of micro-organisms.

The immobilized micro-organisms are then preferably filtered from the water with an ion-exchange resin, i.e., a cationic resin of the methacrylic weak acid type. The cationic resin traps the micro-organisms from the water, and absorbs traces of the silver that may have been used to immobilize the micro-organisms.

It should be noted that when silver-impregnated carbon is used to immobilize the micro-organisms, traces of silver generally dissolve in the water, so that additional processing may be necessary to remove the silver therefrom. The ion-exchange resin is, therefore, also, preferably an absorption or exchange resin or combination of resins to absorb heavy metals, such as, lead, cadmium, silver, antimony, and mercury. The absorption curve is generally linear up to saturation, so that the quantity of heavy metals absorbed is only dependent on the mass of the resin.

A methacrylic weak acid cation-exchange resin has high capacity and a high affinity for heavy meal cations, and therefore, enhances the absorption of the metals in the water. The resin selected is also designed to trap heavy metals. Lead, for example, may be absorbed onto the resin where an organic portion of the resin is thereby displaced. The lead attaches to the resin-forming lead acrylate, thereby displacing a methyl group.

This methyl group, if it remains, in the water, may yield an unpleasant taste to the water. Accordingly, it may be necessary to absorb the organic chemicals generated from the absorption and any other organic chemicals present in the water. In some drinking waters that are chemically treated, chlorinated hydrocarbons may also be present, that need to be removed therefrom.

The preferred resin is commercially available from Rohm and Haas Company, and is designated as Amberlite ® IR-120 PLUS (H) Resin, a strong acid cation exchange resin 9hydrogen form), a styrene/divinylbenzene cation exchange resin. The resin is from 40 to 50 percent by weight mixed in a water solution.

Organic chemicals may be filtered from the water by activated carbon, which is preferably a metallurgical grade of bituminous coal combined with suitable binders to provide a low-ash carbon with a high degree of abrasion resistance and a long cartridge filter life. The activated carbon may be sized for a particular application to efficiently filter soluble organics, taste and odor causing chemicals, and chlorine from the water.

If the water needs to be deionized, a carbon and anion resin may be used. If nitrates, sulfides, radon, or chromates need to be removed from the water, an anion resin or an ion-exchange resin is recommended. The preferred anion resin is commercially available from the Rohm and Haas Company and is designated as Amberlite ® IRA 400 (OH) Resin, a strong base anion exchange resin (hydroxide form), a styrene/divinylbenzene anion exchange resin. The resin is from 35 to 50 percent by weight mixed in a water solution.

Bone char and silver impregnated charcoal are also effective to remove fluoride from the water. The bone char may be ionized.

Where used, the preferred mixed bed resin is commercially available from the Rohm and Haas Company, and designated as Amberlite ® IRN-150 Resin, a mixed bed ion exchange resin (hydrogen and hydroxide forms), an anion-cation exchange resin. The resin is from 38 to 48 percent by weight mixed in a water solution.

Also, the treatment materials discussed above relative to the multiple-stage embodiment of the present invention can be admixed together and in either a packed or loose configuration in the single stage to accomplish treatment of water.

It should be further noted that although the present invention has been described with respect to a single stage mixed bed treatment media or a two-stage treatment media device, it is to be understood that more stages may be included depending on the contaminants sought to be filtered. Likewise, the actual treatment media contained within the stages may be varied depending on the type of filtration sought.

It is to be further understood that the principles of the present invention may be readily incorporated in any of a number of different housings of various designs, which enable the contaminated water to be treated in a serial manner as the water circulates through successive stages, such as by nonlimiting example, as are herewithin disclosed:

(a) in-line unit to be connected to a potable water line in a commercial building or residence;

(b) a unit disposed upon the counter-top having a faucet attachment disposed at the water outlet;

(c) a portable unit through which the contaminated water may be poured and treated as it circulates therethrough; and (d) a portable unit containing a reservoir bottle of water with the water treatment materials affixed onto the outlet of the reservoir bottle.

The water treatment system of the present invention is also useful for installation in the water line of a building humidification system to remove chemicals from the water. The active ingredient in the water treatment system is designed to remove from the water line the targeted chemicals. By minimizing the build-up of chemicals in the humidifier, the amount of time between removing the chemicals deposited on the humidifier wheel can be extended.

Having, thus, described the invention, what is claimed is:

1. An apparatus for treating water passing therethrough, the apparatus discharging potable treated water therefrom, the apparatus comprising:
   (a) a housing having a housing inlet and a housing outlet, the housing receiving the water to be treated through the inlet, the treated water being dischargeable from the housing through the outlet;
   (b) at least one canister being positionable within the housing, the canister having a canister inlet and a canister outlet, the housing inlet being in fluid communication with the canister inlet, the housing outlet being in fluid communication with the canister outlet, the canister being adapted to house a first filtering material for treating water, the first filtering material, being capable of making the water more suitable for human consumption; and
   (c) a first membrane of a first membrane material disposed within the housing, the first membrane being positioned downstream of the canister, the water to be treated passing through the first filtering material and then the first membrane, the first membrane being capable of trapping contaminants in the water to make the water more suitable for human consumption;
   (d) a second membrane formed of the first membrane material;
   (e) a third membrane formed of a second material and superposed on the second membrane, the second and third membranes being interposed between the housing inlet and the first canister, and wherein the second material traps heavy metals or cellulose acetate.

2. The water treatment apparatus of claim 1, further comprising:
   (a) at least a second canister disposed within the housing, the first canister being physically discrete from the second canister, the second canister adapted to house a second material for treating the water disposed therein, the second material being different than the first material, the second material acting alone being capable of making the water more suitable for human consumption.

3. The water treatment apparatus of claim 1, wherein the first canister includes a second material admixed with the first material, the second material being different that the first material, the second material acting alone being capable of making the water more suitable for human consumption.

4. The water treatment apparatus of claim 1, further comprising:
(a) an alarm for indicating a pressure drop through the apparatus when the material is depleted.

5. The water treatment apparatus of claim 4, wherein the alarm is a membrane switch.

6. The water treatment apparatus of claim 1, wherein the second membrane being disposed upstream of the first canister, the second membrane being capable of trapping contaminants in the water to make the water more suitable for human consumption.

7. The water treatment apparatus of claim 1 wherein the housing outlet is in fluid communication with an ice making apparatus.

8. The canister of claim 1, wherein the housing includes a cover member, the cover member comprising:
a cap member having a plurality of protrusions extending about the perimeter thereof, the protrusions being generally evenly spaced thereabout, the cap member having at least one passage disposed proximate to at least one protrusion; and
a sleeve member being of a similar size and shape as the cap member, the sleeve member having a lip, the sleeve member having a plurality of apertures disposed thereabout in fluid communication with the lip, the cap member and the sleeve member being securely retainable by the cooperative engagement between the protrusions and the apertures, the passage being in fluid engagement with at least one aperture when the cap member is securely retained to the sleeve member.

9. A cover member for a water treatment apparatus, the cover member being engageable with a water line, the cover member comprising:
(a) a first member having a plurality of protrusions extending thereabout, the protrusions extending thereabout, the protrusions being generally evenly spaced thereabout, the first member having at least one passage disposed proximate to at least one protrusion; and
(b) a second member being of similar size as the first member, the second member having a lip, the second member having a plurality of apertures disposed thereabout in fluid communication with the lip, the first member and the second member being securely retainable by the cooperative engagement between the protrusions and the apertures, the passage being in fluid engagement with one of the apertures when the first member is securely retained to the second member.

10. The cover member of claim 9, wherein the second member fits into the first member, and the first member has a centrally disposed aperture, the aperture being threaded for the secure engagement therewith to the water line.

11. The cover member of claim 9, wherein the protrusions are rectangularly shaped, the first member having a passage disposed proximate at least one of the protrusions, the apertures being generally L-shaped, the passage being in fluid communication with an aperture when the first member is cooperatively engaged with the second member.

* * * * *